(12) United States Patent
Kia et al.

(10) Patent No.: US 7,226,665 B2
(45) Date of Patent: Jun. 5, 2007

(54) BARRIER COAT FOR OPEN TOOL MOLDING

(75) Inventors: Hamid G Kia, Bloomfield Hills, MI (US); Terrence J Wathen, Sterling Heights, MI (US); Mark A Buffa, Utica, MI (US); Harry A Mitchell, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 314 days.

(21) Appl. No.: 10/601,269

(22) Filed: Jun. 20, 2003

(65) Prior Publication Data
US 2004/0038059 A1 Feb. 26, 2004

Related U.S. Application Data

(60) Provisional application No. 60/400,324, filed on Aug. 1, 2002, provisional application No. 60/400,095, filed on Aug. 1, 2002.

(51) Int. Cl.
*B32B 27/00* (2006.01)

(52) U.S. Cl. .................. 428/515; 428/212; 428/423.7; 428/482; 428/500

(58) Field of Classification Search .................. 428/31, 428/137, 172, 403, 402, 340, 354, 364, 189, 428/193, 212, 213, 219, 220, 323, 325, 515, 428/500, 482, 423.7; 264/250, 255
See application file for complete search history.

(56) References Cited

U.S. PATENT DOCUMENTS

| | | | |
|---|---|---|---|
| 4,029,848 A | 6/1977 | Nelson | |
| 4,182,830 A | 1/1980 | Ford, Jr. | |
| 4,244,993 A | 1/1981 | Platka, III et al. | |
| 4,382,055 A | 5/1983 | Koyanagi et al. | |
| 4,568,603 A | 2/1986 | Oldham | |

(Continued)

FOREIGN PATENT DOCUMENTS

DE  3026316 A1  2/1982

(Continued)

OTHER PUBLICATIONS

Releavnt page from International Search Report from co-pening International Application Serial No. PCT/US03/22668.

(Continued)

*Primary Examiner*—B. Hamilton Hess
*Assistant Examiner*—Camie Thompson
(74) *Attorney, Agent, or Firm*—Kathryn A. Marra (57) ABSTRACT

A multilayer composite contains a gel coat layer, a laminate layer, and a barrier layer disposed between the gel coat and the laminate layer. The laminate contains from 40–80% by weight paste and from 20–60% by weight reinforcing fibers. The barrier coat also comprises a cured polyester resin, and contains reinforcing fibers shorter than those in the laminate layer. The barrier layer has sufficient flexibility to avoid cracking during demolding and handling. Preferably, the barrier layer exhibits an elongation at break of more than 1%, and more preferably about 2% or more. The resin of the barrier layer can contain up to about 25% by weight of the resin of an isophthalic acid based polyester resin. The composites can be made using an open tool molding process.

42 Claims, 1 Drawing Sheet

U.S. PATENT DOCUMENTS

| | | | |
|---|---|---|---|
| 4,587,323 A | | 5/1986 | Toman |
| 5,087,405 A | * | 2/1992 | Maker .................. 264/255 |
| 5,159,044 A | | 10/1992 | Bogner |
| 5,213,747 A | | 5/1993 | Lippert |
| 5,534,211 A | | 7/1996 | Smeal et al. |
| 5,562,954 A | | 10/1996 | Harada et al. |
| 5,777,053 A | | 7/1998 | McBain et al. |
| 5,830,548 A | * | 11/1998 | Andersen et al. .......... 428/36.4 |
| 5,871,604 A | | 2/1999 | Hohman ................. 156/62.8 |
| 6,037,385 A | | 3/2000 | Smith |
| 6,367,406 B1 | | 4/2002 | Sahr et al. |

FOREIGN PATENT DOCUMENTS

| | | | |
|---|---|---|---|
| EP | 0497721 A2 | | 8/1992 |
| EP | 1 162 049 A2 | | 12/2001 |
| GB | 1493547 | * | 11/1977 |
| JP | 63309428 | | 12/1988 |
| JP | 03286850 | | 12/1991 |
| JP | 04010925 | | 1/1992 |
| JP | 04010931 | | 1/1992 |
| JP | 04107143 | | 4/1992 |
| JP | 06064053 | | 3/1994 |
| JP | 06305038 | | 11/1994 |
| JP | 07241916 | | 9/1995 |
| JP | 07258542 | | 9/1995 |
| JP | 2001-150559 | * | 5/2001 |
| JP | 200150559 | | 5/2001 |
| JP | 405301295 A | | 11/2003 |
| WO | WO/85 05113 | | 11/1985 |
| WO | WO 02/04730 A1 | | 1/2002 |

OTHER PUBLICATIONS

Releavnt page from International Search Report from co-pening International Application Serial No. PCT/US03/22677.

Releavnt page from International Search Report from co-pening European Application Serial No. EP 03 01 6810.8.

"Microspheres", Encyclopedia of Polymer Science & Engineerig, vol. 9, pp. 788-795.

Polyesters, Unsaturated, Encyclopedia of Polymer Science & Engineerig, vol. 12, pp. 256-275.

* cited by examiner

BARRIER COAT FOR OPEN TOOL MOLDING

CROSS REFERENCE TO RELATED APPLICATIONS

This application claims the benefit of U.S. provisional applications 60/400,095 and 60/400,324, both of which were filed on Aug. 1, 2002, the disclosures of both of which are incorporated by reference.

FIELD OF THE INVENTION

The present invention generally relates to composite materials containing fiber reinforced cured polyester-resins as a structural layer. More particularly, the invention relates to methods of manufacturing such articles by open tool molding for use as light-weight composites for automobile body panels.

BACKGROUND OF THE INVENTION

Light-weight composites are commonly used in manufacturing cars with lighter weight and improved fuel economy. The composites typically contain a structural layer made of a fiber reinforced cured polyester resin. The structural layer may be produced by compression molding. Protective coatings may be added after demolding to give the composites a finish and surface appearance appropriate for the end use. The composites are currently produced using expensive steel tools and technologically advanced compression molding machines.

Alternative methods of producing light weight composites can be utilized. Open tool molding is an example of such a method. To obtain a reasonable surface appearance, the process requires the use of a gel coat followed by a supporting composite laminate. In the process, a mold surface is first cleaned, a mold release coating is optionally applied, and a layer of a gel coat is applied and partially cured. A laminate is then applied to the gel coat layer, and the laminate and gel coat are cured to form a unitary part having a surface defined by the cured gel coat. Molded parts can be produced by this method to have a finish bearing any desired color originally carried by the gel coat.

In some applications, in order to obtain a smooth surface finish on the gel coat and reduce the extent of fiber read through, a barrier coat may be applied between the gel coat and the laminate. It would be desirable to produce low density, flexible barrier coats for such an application.

SUMMARY OF THE INVENTION

In one aspect, the invention provides a method for preparing a composite article by spray up operation. In a first step, a gel coat is applied onto a mold surface which has been optionally pretreated with a mold release coating. Next, a barrier coat is applied over the gel coat in the mold and thereafter a laminate formula is applied over the barrier coat. The laminate contains from 40–80% by weight paste and from 20–60% by weight reinforcing fibers. The barrier coat also comprises a cured polyester resin, and contains reinforcing fibers shorter than those in the laminate layer. In a preferred embodiment, the multilayer composite has a thickness of about 15 mm or less, and is useful as an automobile body panel.

The barrier layer preferably contains a polyester resin and reinforcing fibers short enough to be sprayed with conventional spray equipment. The fibers, preferably glass fibers, are preferably 1 mm in length or less, and more preferably 0.5 mm or less. The barrier layer has sufficient flexibility to avoid cracking during demolding and handling. In a preferred embodiment, the barrier layer exhibits an elongation at break of more than 1%, and more preferably about 2% or more. The resin of the barrier layer can contain up to about 25% by weight of the resin of an isophthalic acid based polyester resin.

In another aspect, an automobile body panel is provided comprising a gel coat layer, a laminate layer, and a barrier layer disposed between the gel coat and the laminate layer. The barrier layer contains reinforcing fibers and cured polyester resin or resins, as described above.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
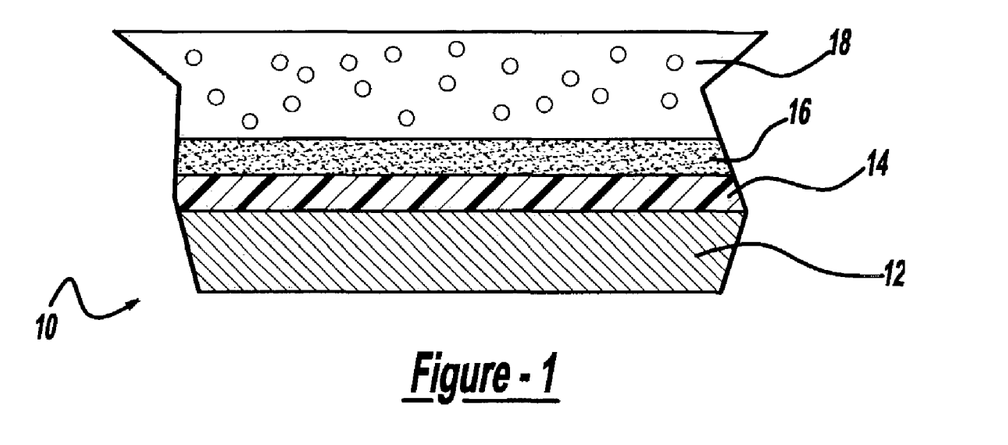
FIG. 1 is a diagram of a three layer composite of the invention in a mold.

Composite articles of the invention comprise a gel coat layer, a laminate layer, and a barrier layer disposed between the gel coat and the laminate. FIG. 1 illustrates schematically a composite of the invention in a mold. A three-layer composite is shown in contact with a surface of a mold 12. A gel coat layer. 14 is applied directly to the mold surface. A barrier coat 16 is applied on top of the gel coat 14. A laminate layer 18 is applied on top of the barrier coat 16. An optional mold release layer (not shown) may be applied between the mold surface 12 and the gel coat layer 14.

Figure 2:
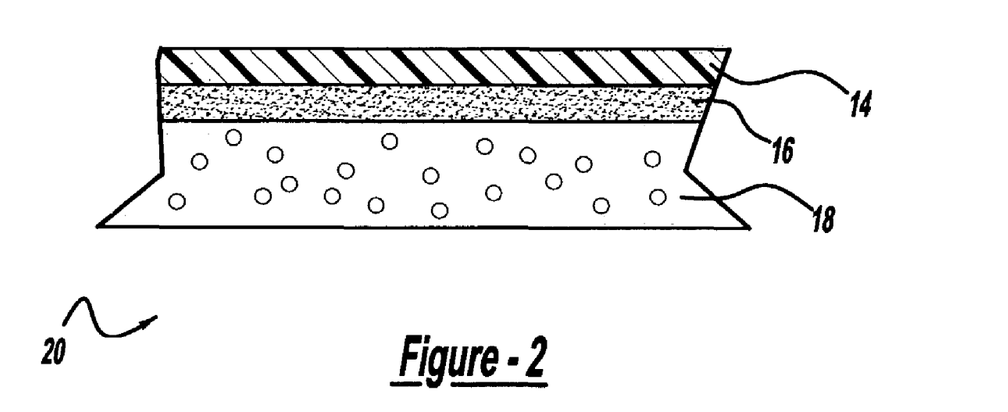
FIG. 2 is a diagram of a three layer composite of the invention after a release from the mold.

FIG. 2 shows in schematic form a composite 20 of the invention. Three layers are shown: a laminate layer 18, a barrier coat 16, and gel coat 14.

The laminate layer, described further below, is made of a cured polyester resin containing reinforcing fibers. The laminate layer provides most of the strength of the composite article. The gel coat layer may be pigmented. It is used to provide an esthetic appearance to the composite article. The barrier coat situated between the gel coat and the laminate provides protection from fiber read through. As such, it contributes to the esthetic appearance of the gel coat layer.

Composites of the invention are generally made by sequentially applying into a mold the various layers of the composite. After an optional mold release layer is applied, a gel coat is first applied into a mold. Thereafter a barrier coat is applied over the gel coat and a laminate is applied over the barrier coat. Each layer may consist of one or more separate layers. In a preferred embodiment, the gel coat and the barrier coat are sprayed into the mold. In one aspect, each pass of the spray gun may be thought of as applying a thin layer. The effects of several passes of the spray gun used to apply the layers is to produce a built up gel coat or barrier coat layer as shown in the figures.

Similarly, the laminate layer may be sprayed on top of the barrier coat in a series of layers or passes with a spray gun. Alternatively, the laminate layer may be applied in a series of hand lay up steps wherein a glass mat is first installed in the mold over the barrier coat and then a paste formula is sprayed over the glass mat to wet out the glass and form the laminate layer.

The composite articles made according to the invention can have a range of thicknesses. Preferably, the laminate layer is thick enough to provide the needed stiffness, strength, or rigidity necessary for the application or end use of the composite article. In a preferred embodiment, the composites serve as automobile body panels. In this embodiment, the thickness of the composite article ranges from about 2 mm up to about 15 mm. More preferably, the thickness is from 3–8 mm. Of this, the gel coat is preferably from about 0.5–1.5 mm thick, the barrier coat from about 0.25 to 2 mm thick and the laminate layer from about 1 to about 6 mm thick.

The composite article is cured before release from the mold. Curing may continue in the demolded article. In preferred embodiments, the individual layers are partially cured after application before the next layer is applied. For example, a gel coat may be applied to a mold and partially cured. Thereafter the barrier coat is applied and again the gel coat and barrier coat are partially cured in the mold. Finally, a laminate layer is applied on top of the barrier coat and the composite article of the invention is cured. Curing is preferably carried out at low temperatures, for example at room temperature or at less than about 50° C.

Gel coats for use in molded plastic articles are well known in the art. The gel coats of the invention typically contain a curable or thermosetting organic resin. In a preferred embodiment, the gel coat contains a pigment to provide color to a surface of the molded article. Generally, the gel coat can contain any type of organic resin capable of curing into a coating layer. Without limitation, the gel coat may include polyurethane resins, polyester resins, epoxy resins, acrylic resins, melamine resins, and the like. They may also contain secondary or crosslinking resins such as acrylic resins, aminoplasts, and hydroxyl resins. The gel coat may contain resins that crosslink with themselves upon curing to form the coating, or they may contain one or a plurality of second resins with complementary functional groups that react with one another to form a crosslinked cured composition.

The barrier coat protects the surface gel coat from fiber read through. One of its functions is to separate the shrinkage of the laminate layer from the gel coat and prevent the shrinkage from harming the esthetic properties of the gel coat surface. The barrier coat should be flexible enough so as not to crack under those conditions and have enough rigidity to support the gel coat. Flexibility is generally reflected in the property of the tensile elongation at break, such as is measured with ASTM method D-638. It has been found that a tensile elongation at break of 0.5% or less is indicative of a barrier coat that is too brittle. Preferably the tensile elongation at break of the barrier coat is at least 1% and preferably about 2% or greater. In a preferred embodiment, a tensile elongation of 2–3% has been found acceptable.

In a preferred embodiment, short reinforcing fibers are added to the barrier composition to increase the strength and modulus. In a typical composition, the flexural modulus is about 1900 MPa and the tensile modulus is about 1896 MPa.

Reinforcing fibers for the barrier coat may be selected from glass fibers, carbon fibers, and ceramic fibers. In a preferred embodiment, glass fibers are used for convenience. The invention will be further described and exemplified by reference to glass fibers.

The length of the glass fibers in the barrier coat is preferred to be less than the length of the fibers in the laminate coat. In a preferred embodiment, the glass fibers in the barrier coat are of such a length that they may be readily sprayed with conventional spray equipment. Thus, glass fibers no longer than about 0.5 mm in length——the size of a nozzle of conventional spray equipment—are preferred. In a preferred embodiment, the glass fibers are of a diameter of 5–10 micrometers.

Milled glass fibers are commercially available having lengths of less than about 0.5 mm. In a preferred embodiment, milled glass fibers of 1/64 inch (about 0.4 mm) are formulated into the polyester resin of the barrier coat formulation. In another preferred embodiment, milled glass fibers having a length of about 0.001 inch (about 0.025 mm) are used. It is believed that the presence of the milled glass fibers in the barrier coat also contributes to the property of reducing or eliminating fiber read through from the laminate to the gel coat.

Other reinforcing fibers, such as ceramic fibers or carbon fibers can also be used in the barrier coat to provide the favorable properties. However, glass fibers are usually preferred, for example because of lower costs. Preferably, the fibers in the barrier coat provide the barrier coat with enough flexibility and strength to avoid cracking during demolding and handling.

To achieve the desired flexibility, the barrier coat contains a flexible polyester resin. Preferably, the polyester resin of the barrier coat comprises up to 25% of an isophthalic resin, based on the total weight of the polyester resin. In a preferred embodiment, the polyester resin comprises 75–100% and preferably 75–99% by weight of a dicyclopentadiene resin. That is, in a preferred embodiment, the polyester resin of the barrier coat contains a major part of a dicyclopentadiene resin and at least one other resin. In a preferred embodiment, the polyester resin of the barrier coat comprises dicyclopentadiene resin and an isophthalic acid resin in ratio of at least 4:1. It has been found that barrier coats with such polyester resin compositions can achieve the desired flexibility of a tensile elongation of at least about 1% at break, as measured by ASTM D-638. In a preferred embodiment, the resin component of the barrier coat composition contains 80–100 parts of dicyclopentadiene resin and up to 20 parts isophthalic acid resin.

The laminate layer of the composites of the invention generally contain reinforcing fibers in a cured polyester resin. The laminate layer provides the strength and rigidity necessary for the end use. It typically contains from about 40–80% by weight of a paste and from 20–60% by weight of reinforcing fibers. In a preferred embodiment, the paste contains an unsaturated polyester resin curable at a temperature of 50° C. or lower and an initiator composition capable of initiating cure of the resin at a temperature of 50° C. or lower. The paste is preferably 70% or more by weight unsaturated polyester resin. The polyester resin of the laminate layer is preferably a low shrink resin, exhibiting a volume shrinkage upon cure of less than about 9.6%, preferably 9% or less and more preferably around about 8% or less. In a preferred embodiment, the polyester resin of the laminate layer comprises a dicyclopentadiene unsaturated polyester resin. The structure and synthesis of the polyester resins are discussed further below.

The reinforcing fibers in the laminate layer may be selected from the group consisting of glass fibers, carbon fibers, and ceramic fibers. In a preferred embodiment, the fibers in the laminate layer have a length of 6 mm (about ¼ inch) or longer. Preferably, the fiber length is about 12 mm or greater and in a particularly preferred embodiment, the reinforcing fiber has a length of about 25 mm. Glass fibers are generally preferred because of their lower costs. They are commercially available in the form of glass fiber roving which is composed of many glass bundles. Each bundle in turn is composed of thousands of filaments The filaments have diameters from 5 to 15 micrometers.

The barrier layer and the laminate layer of the composites may also contain particles having a density lower than that of the resin to reduce the density of the composite article. In a preferred embodiment, the particles comprise hollow microspheres, also known as micro balloons or micro bubbles. Typically, they range in size from about 5 to about 200 micrometers, with a wall thickness between about 0.4 and 1.5 micrometers. They generally have a density in the range of from about 0.03 to about 0.5 g/cm$^3$. The microspheres are used to reduce the density of the resin by displacing some of the resin with air that is encapsulated in the thin wall spheres.

The hollow microspheres are made from material particles by heating them in the presence of blowing agents. The microspheres may be hollow glass microspheres, hollow ceramic microspheres, hollow polymeric microspheres, or hollow carbon microspheres. Polymeric hollow microspheres can be prepared from a aqueous suspension or solution of a film forming resin and a blowing agent. The blowing agents are typically low boiling point hydrocarbons or inorganic or organic material that decomposes to provide a blowing agent.

When glass hollow microspheres are used as the filler in the laminate, they may comprise up to about 25% by weight of the paste. Polymeric hollow microspheres are lighter than the glass hollow microspheres. Accordingly, when polymeric hollow microspheres are used, it is preferred to use them at a level up to 5% by weight of the paste. In a preferred embodiment, the paste contains 90% or more by weight unsaturated polyester resin and up to 5% by weight polymeric hollow microspheres. In a preferred embodiment, the unsaturated polyester resin is a low shrink resin such as dicyclopentadiene resin discussed below. Glass and polymeric microspheres may also be used together. In such a case, the polymeric microspheres comprise up to 5% by weight of the paste, while the glass and polymeric microspheres together make up to 25% by weight of the paste.

In a preferred embodiment, the laminate layer of the invention exhibits a relatively low density as well as sufficient strength for the end use. For example, the laminates layer typically has a density of 1.3 g/cm$^3$ or less, and more preferably 1.2 g/cm$^3$ or less.

Hollow microspheres are commercially available. For example, an expanded polymeric microsphere based on copolymer shells of acrylonitrile and PVDC (polyvinylidene chloride) coated with calcium carbonate is available from Pierce and Stevens Corp. Under the trade name Dualite M6017AE.

The gel coat layer of the composite articles of the invention generally contain a pigment providing the article with the desired color. The barrier coat and the laminate coat may also be pigmented. When pigmented, the barrier coat and/or laminate layer coat typically contain black pigment. A preferred black pigment is carbon black.

Other conventional additives may be used in formulating the laminate layer an the barrier coat in the composites of the invention. These include, without limitation, solvents, wetting agents, and dispersing additives. Defoamers may be used as air release additives, and thixotropes such as fumed silica may be added to adjust the viscosity. Such additives are well known in formulating cured polyester components and are illustrated in the Examples below.

The unsaturated polyester resins contained in the laminate layer, the barrier coat, and optionally the gel coat are well known in the art and available from a variety of commercial sources. They contain an unsaturated monomer and a polyester polymer produced by copolymerization of a polyol component, generally a diol, and a polycarboxylic acid component, generally a dicarboxylic acid. At least part of the polycarboxylic component is made up of an unsaturated carboxylic acid or carboxylic anhydride.

Styrene is the most commonly used unsaturated monomer, and is preferred. Other unsaturated monomers usable to make polyester resins of the invention include, without limitation, vinyltoluene, methyl methacrylate, diallyl phthalate, α-methylstyrene, triallyl cyanurate, and divinylbenzene.

Polyol and diol components used to make polyester resin include without limitation propylene glycol, ethylene glycol, diethylene glycol, neopentyl glycol, dipropylene glycol, dibromoneopentyl glycol, bisphenol dipropoxy ether, propylene oxide, 2,2,4-trimethylpentane-1,3-diol, tetrabromobisphenol dipropoxy ether, 1,4-butanediol, and dicyclopentadiene hydroxyl adducts.

Saturated dibasic acids or anhydrides include, without limitation, phthalic anhydride, isophthalic acid, adipic acid, chlorendic anhydride, tetrabromophthalic anhydride, tetrahydrophthalic anhydride, terephthalic acid, tetrachlorophthalic anhydride, glutaric acid, and cyclopentadiene-maleic anhydride Diels-Alder adducts. Examples of unsaturated acids or anhydrides include without limitation maleic anhydride, fumaric anhydride, methacrylic acid, acrylic acid, and itaconic acid.

When the polycarboxylic acid component comprises one of the phthalic, isophthalic, or terephthalic acid derivatives such as those mentioned above, the polyester resin is commonly referred to an "isophthalic resin", an "isophthalic acid resin", or an "isophthalic acid based resin".

When the diol or glycol component contains the dicyclopentadiene hydroxyl adducts mentioned above, or when the dicarboxylic acid or anhydride component includes dicyclopentadiene-maleic anhydride Diels-Adler types of adducts, the polyester resins are commonly referred to as dicyclopentadiene resins, or DCPD resins. During the process to make the dicyclopentadiene resins, dicyclopentadiene can dissociate into cyclopentadiene monomer. Both the monomer and the dimer can react with maleic anhydride or other unsaturated acids as well as with the diol components to form resins exhibiting both terminal cycloaliphatic ether and cycloaliphatic dibasic acid groups derived from cyclopentadiene and unsaturated acid ester derivatives.

In a non-limiting example, to make a DCPD resin, dicyclopentadiene may be added gradually to a reactor in which maleic anhydride and a glycol have been added. Depending on the addition rate and the reactor temperature, dicyclopentadiene initially enters into chain termination reactions with the glycol maleates. At higher temperatures, dicyclopentadiene dissociates into cyclopentadiene and enters into Diels-Adler types of addition reactions with unreacted, unsaturated acid anhydride and with the glycol maleates or other polyester polymer species containing unsaturation.

The polyester resins of the invention also contain an initiator composition that is capable of initiating cure of the polyester resin compositions at a reasonably low temperature. In preferred embodiment, cure occurs at 50° C. or less. In a particularly preferred embodiment, cure occurs at around room temperature or about 20–30° C. Generally, the initiator composition includes both an initiator compound and an activator or promoter. The initiator and the activator or promoter work in tandem to kick off initiation at a desired processing temperature. Preferred catalysts or initiators include various organic or peroxides and peracids. Particularly preferred are those initiators or catalysts capable of initiating cure at a temperature of about 50° C. or less. Examples include without limitation benzoyl peroxide, methyl ethyl ketone hydroperoxide (MEKP), and cumene hydroperoxide. For the preferred MEKP, activators such as cobalt octoate, cobalt 2-ethylhexanoate, and cobalt naphthenate may be added, resulting in initiator compositions capable of curing the polyester resin at a temperature from about room temperature up to 50° C. Typically, the initiator is held separately from the rest of the composition until the final spray. During spray, the initiator and polyester resin composition are combined, and cure begins. Some commercially available polyester resins include accelerators and promoters such as the cobalt octoate and cobalt naphthenate mentioned above. In this case it is necessary to provide the initiator catalyst, such as MEKP, separately upon spraying to begin cure of the layer.

In one aspect, the invention provides multilayer composite articles containing a gel coat layer comprising a thermosetting resin, a fiber reinforcing laminate layer comprising first fibers having a first length, and a barrier layer disposed between the gel coat and the laminate layers. The barrier layer contains second fibers having a second length shorter than the first length dispersed in a polyester resin. In a preferred embodiment, the polyester resin of the barrier coat comprises up to 25% of an isophthalic resin, based on the total weight of the polyester resin. In another preferred embodiment, the polyester resin comprises 75–100% by weight of a dicyclopentadiene resin. In another embodiment, the polyester resin contains 75–99% by weight dicyclopentadiene resin and 1–25% by weight isophthalic resin. The second fibers are preferably glass fibers and the second length is preferably 1 mm or less, more preferably 0.5 mm or less. In other embodiments, the glass fibers of the barrier coat are 1/64 inch (about 0.4 mm) or less. The barrier coat may further comprise polymeric hollow microspheres. The microspheres may be added to the barrier coat layer to reduce the density. Typically up to about 5% polymeric hollow microspheres by weight may be added to the barrier coat composition.

In another aspect, the invention provides a method for preparing a composite using a spray up operation, comprising the steps of applying a gel coat into a mold, applying a barrier coat over the gel coat, and applying a laminate formula over the barrier coat. In a preferred embodiment, the gel coat is applied to a thickness of from 0.2 mm to 2 mm, the barrier coat to a thickness of 0.5 to 5 mm, and the laminate layer or layers to a thickness from 1 to 10 mm. In a preferred embodiment, the composite is to be used as an automobile body panel, having a thickness of from 2 to 15 mm, preferably from 2 to 12 mm, more preferably from 3 to 8 mm. In a preferred embodiment, the composite is about 4 mm thick.

The laminate layer preferably comprises a laminate composition such as described above and also described in Assignee's provisional application No. 60/400,095, filed Aug. 1, 2002, entitled "Low Shrink Low Density Laminate Formulation". The laminate preferably contains a paste and a filler wherein the paste comprises a low shrink polyester resin such as a dicyclopentadiene resin, up to 25% by weight hollow microspheres, and an initiator capable of initiating cure at a temperature of 50° C. or less. The laminate composition also contains reinforcing fibers having a length greater than or equal 6 mm, preferably greater than or equal about 12 mm. In a particularly preferred embodiment, the laminate layer comprises glass fibers of approximately 25 mm (1 inch) in length.

Composite articles are prepared according to the invention comprising a gel coat layer, a laminate layer and a barrier layer disposed between the gel coat and the laminate.

In an alternate method, the laminate layer may be applied by hand laying a glass cloth on top of the barrier coat layer in the mold and applying a laminate resin composition to the glass cloth. In a preferred embodiment, the laminate resin composition comprises 90% or more by weight of a low shrink polyester resin and up to 5% by weight of polymeric hollow microspheres. In a preferred embodiment, the composite article is used as an automotive body panel. In one embodiment, the maximum thickness of the body panel is about 6 mm and in another preferred embodiment, the maximum thickness of the body panel is about 4 mm.

The invention has been described above with respect to preferred embodiments. Further non-limiting examples given in the examples that follow.

EXAMPLE 1

Preparation of a Laminate Formulation

The following components are mixed together to form a laminate formulation. The table gives the amount by weight of each component used. The amounts are expressed as parts by weight of the paste, unless otherwise indicated. As stated earlier, the laminate comprises the paste and fiber. In this Example, the fibers constitute about 38% by weight of the laminate and the balance is the paste. A description of each component follows as well as the method for preparing a laminate paste from the components.

| Components | Parts |
| --- | --- |
| AOC VX-2190 | 130 |
| Byk W-972 | 1.05 |
| Byk R-605 | 0.30 |
| Byk A-555 | 0.30 |
| AN bubbles (Dualite, M6017AE) | 3.00 |
| Fumed Silica (TS-720) | 1.60 |
| MEKP (Aldrich, 32% in DMP) | 1.95 |
| Glass Fiber (Certainteed 299) | 38% |

AOC VX-2190 is a sprayable unsaturated polyester resin with a styrene monomer content of 32.52%, manufactured by Alpha/Owens-Corning. It contains a dicyclopentadiene resin. A thixotrope has been added by the manufacture to bring its viscosity to a Brookfield viscosity of 670 cps using an RVT viscometer at 20 RPM with a #3 spindle. The component also contains a promoter, cobalt 2-ethylhexanoate. The density is 1.100 g/cc.

BYK W-972 is a wetting and dispersing additive manufactured by BYK. The density is 1.010 g/cc.

BYK R-605 is a wetting and dispersing additive manufactured by BYK. It facilitates dispersion during incorporation of fumed silicas. It increases and stabilizes thixotropic behavior. The density is 0.930 g/cc.

BYK A-555 is an air release additive manufactured by BYK. It is a solution of silicon free, foam destroying polymers with a density of 0.880 g/cc.

Dualite M6017AE is expanded polymeric microspheres based on copolymer shells of acrylonitrile and PVDC (polyvinylidene chloride) coated with calcium carbonate, manufactured by Pierce and Stevens Corp. The mean particle size is 70 microns, and the density is 0.13 g/cc.

TS-720 is a fumed silica thixotrope manufactured by Cab-O-Sil. The apparent density is 0.050 g/cc.

MEKP is a methyl ethyl ketone peroxide solution manufactured by Aldrich. It is a 32%0 solution in dimethyl phthalate.

Glass Fiber Certainteed #299 is a glass fiber 299-207-CT manufactured by Certainteed. The average length of the glass fiber is 1 inch. The density is 2.54 g/cc.

The above components (minus the glass fibers) are mixed as follows to form a paste:

Liquid VX-2190 resin is weighed into a five-gallon metal can. Thereafter the liquid W-972, R-605, and A-55 are added and stirred slightly with a wooden tongue depressor. The above liquid components are then mixed at 400 RPM for 5 minutes. The polymeric microspheres, Dualite M6017AE are slowly mixed in over a seven minute period. Next the fumed silica, TS-720 is added over a seven minute period. The mixing speed is increased to 700 RPM for about eleven minutes until the paste temperature reaches a temperature of about 26° C. The mixing speed is reduced to 400 RPM and mixing continues for an additional 2 minutes.

The peroxide initiator, MEKP, is added through the spray gun during part preparation. The gun is also set to deliver 38 parts by weight glass fiber for every 62 parts of the paste.

The formulation can be adjusted to provide a range of final viscosities to meet the processing requirements. The viscosity of the formula above is about 1290 cps measure at 22° C. using a Brookfield RVT viscometer, spindle number 3 at 20 RPM. In a lab test, an epoxy mold is treated with mold release. Then a 0.5 mm gel coat is applied to the mold and partially cured, followed by a barrier coat of 1.0 mm thickness. After partial curing, a 2.5 mm thick laminate is applied in two steps using the above formulation. In the first step a 1 mm thick laminate is applied and partially cured, followed by a 1.5 mm thick laminate. Following complete cure of all layers, the composite panel is demolded. The composite has an excellent surface appearance.

EXAMPLE 2

Preparation of a Laminate Formulation

The following components are used in the preferred ranges indicated.

| Component | Density | Range |
|---|---|---|
| Yabang DC-191 | 1.100 | 90–100 |
| Byk S 750 | 0.840 | 0–1.0 |
| Byk R 605 | 0.930 | 0–0.9 |
| Byk A 555 | 0.880 | 0–0.5 |
| PBQ (Ashland Mod E - 5%) | 1.130 | 0–0.3 |
| Cobalt Naphthenate (8%) | 0.950 | 0.05–0.2 |

-continued

| Component | Density | Range |
|---|---|---|
| AN Bubbles (Dualite, M6017AE) | 0.130 | 0–5.0 |
| Fumed silica (PTG) | 1.800 | 0–3.0 |
| Black (CM-2015) | 1.24 | 0–0.5 |

Yabang DC-191 is a sprayable unsaturated polyester resin with a styrene monomer content of 29.76% manufactured by Yabang in China. It is a fumaric acid based polyester containing dicyclopentadiene, dimethylstyrene, and dicyclopentyl alcohol. There is no promoter or thixotrope. The Brookfield viscosity is 378 cps using an RVT viscometer at 20 RPM with a #2 spindle. The resin contains the promoter, cobalt naphthenate.

S-750 is a combination of waxes with polar components, manufactured by BYK. It is used as a styrene emission suppressant developed specially for DCPD resins.

R-605 is a wetting and dispersing additive to facilitate dispersion during incorporation of fumed silicas. It is manufactured by BYK.

A-555 is a solution of silicone free foam-destroying polymers that acts as an air release additive, manufactured by BYK.

Modifier E is an inhibitor solution of 4.99 weight percent para-benzoquinone in diallyl phthalate, manufactured by Ashland Chemical Co.

Cobalt naphthenate is a promoter for polyester resins manufactured by Sigma Chemical Co. It is 8% by weight cobalt.

Dualite M6017AE is expanded polymeric microspheres manufactured by Pierce and Stevens.

CM-2015 black is a colorant manufactured by Plasticolors.

PTG is an untreated fumed silica thixotrope manufactured by Cab-O-Sil.

Delta X-9 is methyl ethyl ketone peroxide solution manufactured by Elf Atochem NA Glass Fiber #299-207-CT is a 1 inch glass fiber manufactured by Certainteed.

A low density laminate paste may be formulated as follows:

Liquid Yabang DC-191 polyester resin is weighed into a 5 gallon can. The liquid S-750 wax is first mixed well in its container and then weighed into a smaller container. The polyester resin is stirred at 400 RPM while the wax is slowly added. Mixing continues for a total of 10 minutes and stopped.

The liquid R-605 and liquid A-555 is weighed into the can of the polyester resin mixture and stirred slightly with a wooden tongue depressor. The liquid modifier E, weighed earlier in a syringe, is added and stirred slightly with a wooden tongue depressor. The 5 gallon can is now positioned under a mixer and a mixing blade attached. The liquid components are mixed at 400 RPM for 5 minutes.

The liquid cobalt naphthenate, weighed earlier in a syringe, is added while mixing continues for a total of 5 minutes. The polymeric microspheres, Dualite M6017AE, are slowly mixed in over a 5 minute period. The black colorant CM-2015 is mixed in over a 3 minute period. While continuing stirring at 400 RPM, the fumed silica is slowly added over a 4 minute period. After all the fumed silica is added, the mixing speed is increased to 700 RPM for about 6 minutes until the paste reaches a temperature of about 26° C. The total time of mixing until the paste reaches this temperature varies depending on the ambient temperature.

Then the mixing speed is reduced to 400 RPM and mixing is stopped after 2 additional minutes. The total mixing time is about 30 minutes.

A peroxide initiator (Delta X-9) is added to the spray gun during part preparation. The gun is also set to deliver the glass fibers simultaneous with application of the paste and initiator.

EXAMPLES 3–5

Laminate formulations are put together with the ingredients indicated below, according to the general procedures described in Example 1 and 2. In all examples, the MEKP and the glass fibers are added through the spray gun during part preparation.

EXAMPLE 3

| Component | Parts |
| --- | --- |
| Yabang DC-191 | 100.00 |
| Byk S 750 | 1.00 |
| Byk R 605 | 0.23 |
| Byk A 555 | 0.23 |
| PBQ (Ashland Mod E - 5%) | 0.110 |
| Cobalt Naphthenate (8%) | 0.090 |
| AN Bubbles(Dualite,M6017AE) | 2.31 |
| Fumed silica (PTG) | 0.57 |
| Black (CM-2015) | 0.05 |
| MEKP (Delta X-9) | 2.3 |
| Glass Fiber (Certainteed 299) | 52.37 |

EXAMPLE 4

| Component | Parts |
| --- | --- |
| AOC VX-2190 | 100.00 |
| Byk S 750 | 1.00 |
| Byk R 605 | 0.23 |
| Byk A 555 | 0.23 |
| PBQ (Ashland Mod E - 5%) | 0.110 |
| Cobalt Naphthenate (8%) | 0.090 |
| Glass microspheres K46 (3M) | 10.50 |
| Fumed silica (PTG) | 0.31 |
| Black (CM-2015) | 0.05 |
| MEKP (Delta X-9) | 2.2 |
| Glass Fiber (Certainteed 299) | 52.37 |

EXAMPLE 5

| Component | Parts |
| --- | --- |
| Yabang DC-191 | 100.00 |
| Byk R 605 | 0.23 |
| Byk A 555 | 0.23 |
| PBQ (Ashland Mod E - 5%) | 0.110 |
| Cobalt Naphthenate (8%) | 0.090 |
| AN Bubbles(Dualite,M6017AE) | 2.31 |
| Glass microspheres K46 (3M) | 10.50 |
| Fumed silica (PTG) | 0.57 |
| Black (CM-2015) | 0.05 |
| MEKP (Delta X-9) | 2.3 |
| Glass Fiber (Certainteed 299) | 43.51 |

EXAMPLE 6

A barrier coat composition is formulated as follows.

| Components | Parts |
| --- | --- |
| AOC VX-2190 | 100 |
| Byk W 972 | 0.81 |
| Glass Bubbles (3M,K46/4000) | 21.00 |
| Milled Glass Fiber (OCF 1/64") | 41.42 |
| Fumed Silica (TR-720) | 0.61 |
| MEKP (Aldrich, 32% in DMP) | 1.95 |
| Total | 165.79 |

Glass Bubbles (3M,K46/4000) are glass hollow microspheres sold by 3M.

Milled Glass Fiber is glass fibers of 5–10 micrometers in diameter and an average length of 1/64", available commercially from Owens Corning.

Other materials are as listed in Example 1.

The formulation can be adjusted to provide a range of final viscosities to meet processing requirements. In a lab test, a glass plate is treated with mold release for ease of demolding. Then a 0.5 mm gel coat is applied on the glass plate and partially cured. A barrier coat layer of 0.5 mm thickness is then applied containing the components listed above. After partial cure of the barrier coat a 3 mm thick laminate is applied in two steps. In the first step a 1 mm thick laminate is applied and partially cured followed by a 2 mm thick laminate. The laminate is a polyester resin reinforced with 25% by weight chopped fibers. After complete cure of all layers at room temperature the plaque is demolded. The surface is smooth and free of fiber read through. A similar process with no barrier coat is conducted and the resultant plaque shows extensive fiber read through. The thickness of the barrier coat may need to be adjusted depending on the processing conditions, the chemistry and the thickness of the gel coat and the laminate.

EXAMPLE 7

Formulation of a Barrier Coat

| Component | density, g/cm$^3$ | Range |
| --- | --- | --- |
| Yabang DC-191 | 1.100 | 75–100 |
| Eterset 2110-1 | 1.100 | 0–25 |
| Styrene Monomer | 0.907 | 0–10 |
| Byk W 972 | 1.010 | 0–1.0 |
| Byk R 605 | 0.930 | 0–0.9 |
| Byk A 555 | 0.880 | 0–0.5 |
| PBQ (Ashland Mod E - 5%) | 1.130 | 0–0.3 |
| AN Bubbles(Dualite,M6017AE) | 0.130 | 0–5.0 |
| Glass bubbles (3M, K37) | 0.37 | 0–5.0 |
| Cobalt Naphthenate (8%) | 0.950 | 0.05–0.2 |
| N,N-Dimethylaniline | 0.956 | 0–0.3 |
| Med Teal Blue (CF-31977) | 1.500 | 0–0.3 |

-continued

| Component | density, g/cm³ | Range |
|---|---|---|
| Milled Glass Fiber (OCF 1/64") | 2.540 | >0–30 |
| Fumed silica (PTG) | 1.800 | 0–3.0 |

Yabang DC-191, Byk R 605, Byk A 555, PBQ, AN Bubbles, Cobalt naphthenate, and fumed silica are as defined in Example 2.

Eterset 2110-1 is a flexible phthalic acid based polyester resin manufactured by Eternal Chemical Company, Taiwan. It contains no promoter or thixotrope. It has a styrene monomer content of 23.26%, a viscosity of 2384 cps using an RVT viscometer at 10 RPM with a #2 spindle.

Styrene monomer, manufactured by J. T. Baker, has a density of 0.907.

BYK W-972 is a wetting and dispersing additive manufactured by BYK. The density is 1.010 g/cc.

Glass Bubbles (3M,K37) are glass hollow microspheres sold by 3M.

N,N-Dimethylaniline is a tertiary amine used as an accelerator, manufactured by EM Science.

Medium teal blue is a colorant manufactured by Plasticolors, Inc. Colorants are used to differentiate the barrier coat from the gel coat. It is used to help the spray/chop operator spray a more uniform barrier coat thickness.

Milled glass fiber is 737-BC 1/64 inch, manufactured by Owens-Corning.

PTG is an untreated fume silica thixotrope manufactured by Cab-O-Sil.

Delta X-9 is a methyl ethyl ketone peroxide solution manufactured by Elf Atochem.

A barrier coat composition is formulated from the above components as follows.

The liquid Yabang DC-191 polyester resin is weighed into a 5 gallon metal can. The Eterset 2110-1 polyester resin weighed into the can and stirred slightly with a wooden tongue depressor. The styrene monomer, W-972, W-605, and A-555 are weighed into the can and stirred slightly with a wooden tongue depressor.

Liquid Modifier E, weighed earlier in a syringe, is added and stirred slightly with a wooden tongue depressor. The 5 gallon can is positioned under a mixer and the mixer blade is attached.

About 50–60 grams of the Dualite M6017AE polymeric bubbles are added to the liquid component. Then the mixer is turned on and the combination mixed at 400 RPM for about 1 minute. The balance of the polymeric bubbles is added over an additional 9 minute mixing period.

The medium blue teal colorant is then mixed in over a 2 minute period. The liquid cobalt naphthenate, weighed earlier in a syringe, is added over a 2 minute period. Then the dimethylaniline, weighed earlier in a syringe, is mixed in over a 2 minute period.

Mixing continues at 400 RPM while the milled glass fiber is added during a 5 minute period. Finally the fumed silica is slowly added over a 7 minute period.

The mixing speed is increased to 700 RPM for about 7 minutes or until the paste reaches a temperature of 29° C. The mixing time varies depending on the ambient temperature. The mixing speed is reduced to 400. RPM and stopped after an additional 2 minutes of mixing. The total mixing time is about 37 minutes. Delta X-9 peroxide initiator is added to the spray gun during part preparation at a treatment level of about 1–2%.

EXAMPLES 8–10

Barrier coats are formulated according to Example 2, with the following ingredients.

EXAMPLE 8

| Component | Parts |
|---|---|
| Yabang DC-191 | 77.5 |
| Eternal 2110-1 | 22.5 |
| Styrene Monomer | 5 |
| Byk W 972 | 0.81 |
| Byk W 605 | 0.6 |
| Byk A 555 | 0.23 |
| PBQ (Ashland Mod E - 5%) | 0.044 |
| AN Bubbles(Dualite,M6017AE) | 4.8 |
| Cobalt Naphthenate (8%) | 0.1 |
| N,N-Dimethylaniline | 0.2 |
| Med Teal Blue (CF-31977) | 0.03 |
| Milled Glass Fiber (OCF 1/64") | 30 |
| Fumed silica (PTG) | 3 |
| MEKP (Delta X-9) | 2.2 |

EXAMPLE 9

| Yabang DC-191 | 90.5 |
|---|---|
| Eternal 2110-1 | 9.95 |
| Byk W 972 | 0.81 |
| Byk A 555 | 0.23 |
| PBQ (Ashland Mod E - 5%) | 0.05 |
| AN Bubbles(Dualite,M6017AE) | 4.2 |
| Cobalt Naphthenate (8%) | 0.1 |
| N,N-Dimethylaniline | 0.2 |
| Med Teal Blue (CF-31977) | 0.03 |
| Milled Glass Fiber (OCF 1/64") | 25 |
| Fumed silica (PTG) | 2.5 |
| MEKP (Delta X-9) | 2.2 |

EXAMPLE 10

| AOC VX2190 | 91.2 |
|---|---|
| Byk W 972 | 0.81 |
| PBQ (Ashland Mod B - 5%) | 0.05 |
| AN Bubbles(Dualite,M6017AE) | 3.5 |
| Glass microspheres K46 (3M) | 15 |
| Cobalt Naphthenate (8%) | 0.1 |
| N,N-Dimethylaniline | 0.2 |
| Med Teal Blue (CF-31977) | 0.03 |
| Milled Glass Fiber (OCF 1/64") | 20 |
| Fumed silica (PTG) | 2.7 |
| MEKP (Delta X-9) | 2.2 |

EXAMPLE 11

Preparation of A Composite Article

A gel coat composition is sprayed into a mold to a desired thickness. Next a barrier coat composition, such as those in Examples 6–10, is applied in the mold over the gel coat. Next, a laminate formulation, such as described in Examples 1–5, is applied as follows.

An operator hooks up a spray gun, such as are commercially available from Magnum in Florida to a bucket containing a paste, a second bucket containing a solution of the cure initiator, and a source of fiber glass rovings. On operation of the gun, the paste and the initiator are combined and sprayed onto the barrier coat in the mold. At the same time the glass rovings are advanced through a cutter to deliver 1" glass fibers that meet the solution of paste and initiator in mid-air and fall on the barrier coat in the mold. The operator continues to operate the gun with spraying in a side-to-side motion until the desired thickness of build up of the laminate applied in the mold is obtained. Thereafter, the composite is allowed to cure in the mold, followed by demolding of the article. Cure may be carried out at room temperature or up to about 50° C. Depending on the temperature, the cure time may range from several minutes to several hours to up to a day.

The description of the invention is merely exemplary in nature and, thus, variations that do not depart from the gist of the invention are intended to be within the scope of the invention. Such variations are not to be regarded as a departure from the spirit and scope of the invention, which are defined in the appended claims.

We claim:

1. A multilayer composite article comprising:
   a gel coat layer comprising a thermosetting resin;
   a fiber reinforced laminate layer comprising a first set of fibers having a first length; and
   a barrier layer disposed between the gel coat layer and the laminate layer;
   wherein the barrier layer comprises a second set of fibers dispersed in a polyester resin, said second fibers having a second length shorter than the first length wherein the first length is 6 mm or greater and the second length is 1 mm or less.

2. A multilayer composite according to claim 1, wherein the polyester resin comprises up to 25% of an isophthalic acid resin, based on the total weight of the polyester resin.

3. A multilayer composite according to claim 1, wherein the polyester resin comprises 75–100% by weight of a dicyclopentadiene resin, based on the total weight of the polyester resin.

4. A multilayer composite according to claim 1, wherein the polyester resin comprises 75–99% by weight dicyclopentadiene resin and 1–25% by weight isophthalic resin.

5. A multilayer composite according to claim 1, wherein the second length is 0.5 mm or less.

6. A multilayer composite according to claim 1, wherein the second length is 0.4 mm or less.

7. A multilayer composite according to claim 1, wherein the gel coat is ½–2 mm thick, the barrier coat is 1–3 mm thick, and the laminate layer is 2–5 mm thick.

8. A multilayer composite according to claim 1, wherein the barrier coat comprises up to 45% by weight milled glass fibers of length less than 1 mm and 50–95% by weight resin comprising dicyclopentadiene resin and isophthalic acid ratio in a ratio of at least 4:1.

9. A multilayer composite according to claim 1, wherein the barrier coat further comprises polymeric hollow microspheres.

10. An automotive body panel comprising:
    a gel coat layer;
    a laminate layer; and
    a barrier coat disposed between the gel coat and the laminate layer,
    wherein the barrier coat comprises a polyester resin and reinforcing fibers of length 1 mm or less.

11. A body panel according to claim 10, wherein the barrier coat exhibits an elongation at break of at least 1%.

12. A body panel according to claim 10, wherein the barrier coat exhibits an elongation at break of at least 2%.

13. A body panel according to claim 10, wherein the barrier coat comprises dicyclopentadiene resin and isophthalic resin in a ratio of 4:1 and higher.

14. A body panel according to claim 10, wherein the laminate layer comprises a dicyclopentadiene resin and glass fibers of 6 mm in length or greater.

15. A body panel according to claim 14, wherein the laminate further comprises hollow polymeric microspheres.

16. A body panel according to claim 10, wherein the laminate layer, the barrier coat, or both further comprise a pigment.

17. A body panel according to claim 16, wherein the pigment comprises carbon black.

18. A body panel according to claim 10, wherein the barrier coat comprises reinforcing glass fibers of length 0.5 mm or less.

19. A barrier coat composition comprising:
    a resin component comprising:
    80–100 parts of dicyclopentadiene resin and up to 20 parts of an isophthalic acid resin, and
    a reinforcing fiber component comprising fibers having a length of 1 mm or less mixed with the resin component.

20. A composition according to claim 19, wherein the reinforcing fiber component comprises fibers having a length of 0.5 mm or less.

21. A composition according to claim 19, wherein the fibers have a length of about 0.4 mm.

22. A composition according to claim 19, wherein the fibers have a length of about 0.025 mm.

23. A composition according to claim 19, wherein the composition exhibits an elongation at break of 1% or greater.

24. A composition according to claim 19, wherein the composition exhibits an elongation at break of 2% or greater.

25. A composition according to claim 19, wherein the barrier coat further comprises a filler selected from the group consisting of hollow glass microspheres and polymeric hollow microspheres.

26. A composition according to claim 19, wherein the resin comprises up to 40% by weight styrene monomer.

27. A method for preparing a composite article by spray up operation, comprising the steps of:
    applying a gel coat into a mold;
    applying a barrier coat over the gel coat in the mold; and
    applying a laminate formula over the barrier coat,
    wherein applying the laminate formula comprises providing the laminate formula comprising 20–60% by weight of first reinforcing fibers having a first length of 6 mm or greater and 40–80% by weight of a paste comprising a laminate coat polyester resin; and
    wherein applying the barrier coat comprises providing second fibers having a length of 1 mm or less dispersed in a barrier coat polyester resin.

28. A method according to claim 27, wherein the gel coat applied to a thickness of 0.2 to 2 mm, the barrier coat is applied to a thickness of 0.5 to 5 mm, and the laminate layer is applied to a thickness of 1–10 mm.

29. A method according to claim 27, wherein the thickness of the composite article is from 2 to 15 mm.

30. A method according to claim 27, wherein the composite article is an automotive body panel.

31. A method according to claim 27, wherein the laminate formula fiber comprises polymeric hollow microspheres.

32. A method according to claim 27, wherein the first reinforcing fiber comprise glass fibers of 12 mm or greater in length.

33. A method according to claim 27, wherein the barrier coat polyester resin comprises 75–100 parts of a dicyclopentadiene resin and 1–25 parts of an isophthalic acid resin.

34. A method of producing an automotive body panel comprising the steps of:
  applying a gel coat composition to a mold surface;
  applying a barrier coat composition to the gel coat in the mold;
  applying a fiber reinforced laminate composition comprising fibers having a first length onto the barrier coat in the mold;
  curing at 50° C. or less; and
  removing the cured article from the mold,
wherein applying the barrier coat comprises providing glass fibers having length of 1 mm or less dispersed in a polyester resin.

35. A method according to claim 34, wherein the gel coat comprises a thermosetting resin.

36. A method according to claim 34, wherein the barrier coat exhibits elongation at break of 1% or greater.

37. A method according to claim 34, wherein the barrier coat exhibits elongation at break of 2% or greater.

38. A method according to claim 34, wherein the barrier coat comprises 100 parts of a polyester, including up to 20 parts of an isophthalic acid polyester resin.

39. A method according to claim 38, wherein the barrier coat comprises a dicyclopentadiene resin.

40. A method according to claim 39, wherein the barrier coat comprises glass fibers having a length of 1 mm or less.

41. A method according to claim 34, wherein the barrier coat comprises glass fibers having a length of 0.5 mm or less.

42. A method according to claim 34, comprising the steps of applying the gel coat to a thickness of 0.5–2 mm, applying the barrier coat to a thickness of 1–3 mm, and applying the laminate coat to a thickness of 2–5 mm.

* * * * *